C. SCHÄFLER.
HULLING MACHINE.
APPLICATION FILED FEB. 18, 1918.
1,276,577.
Patented Aug. 20, 1918.
3 SHEETS—SHEET 3.
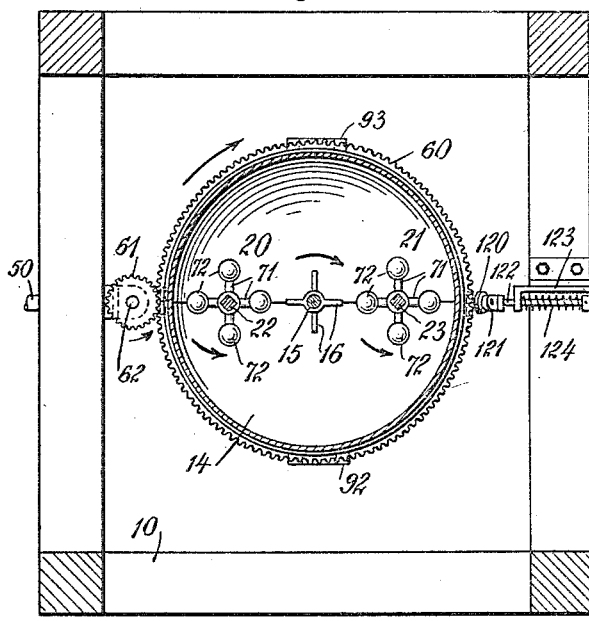
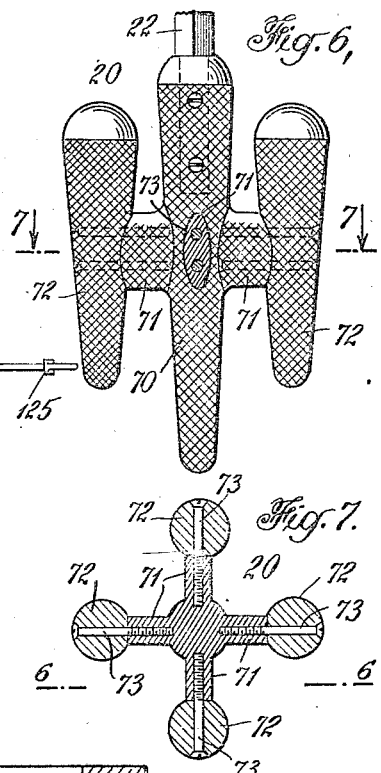
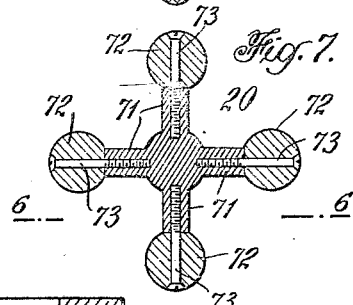
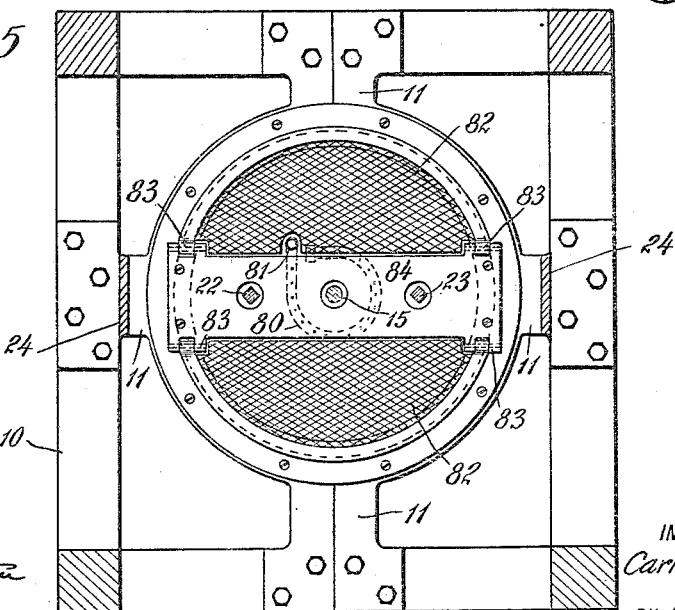
WITNESSES
INVENTOR
Carlos Schäfler
BY
ATTORNEY

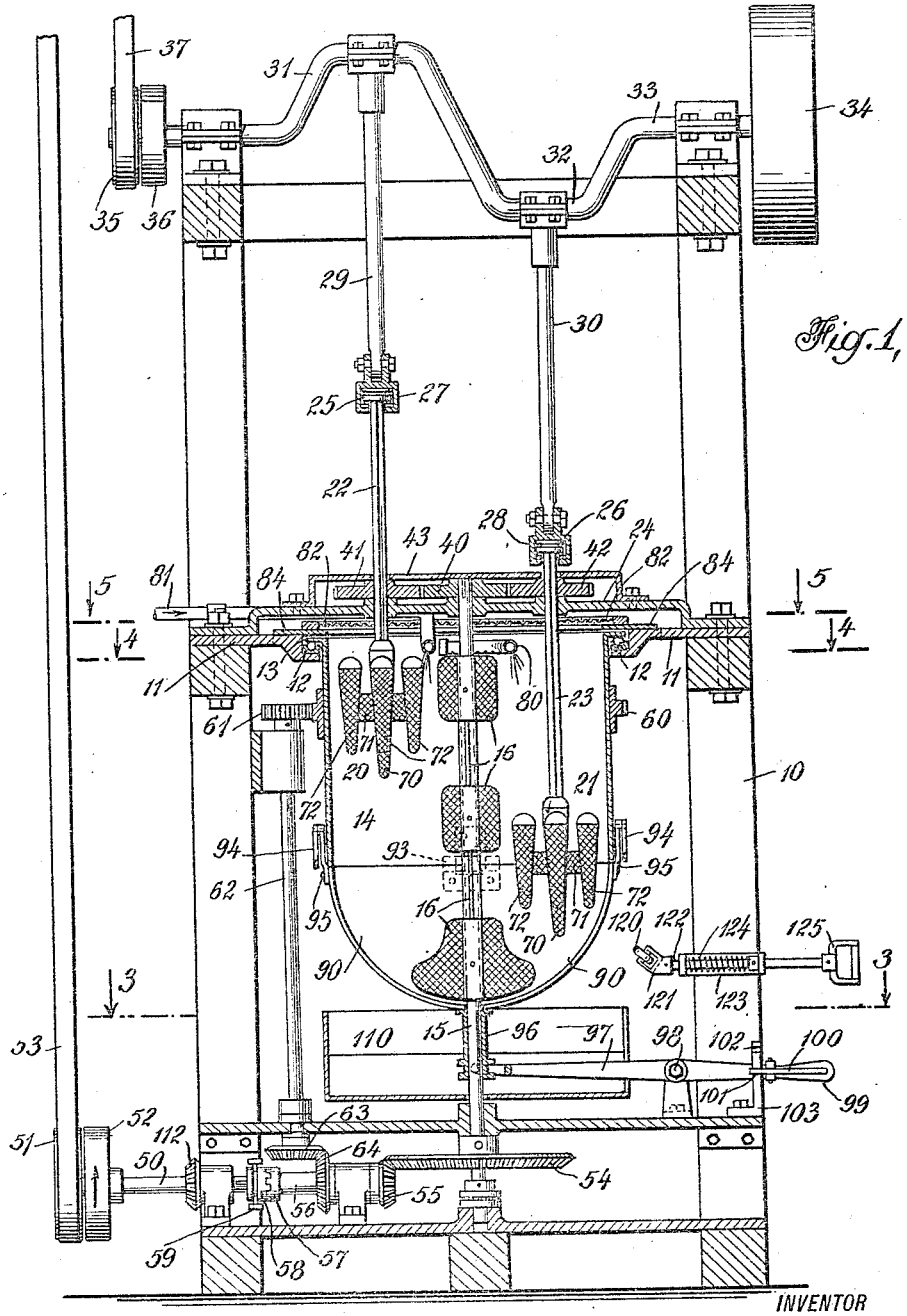

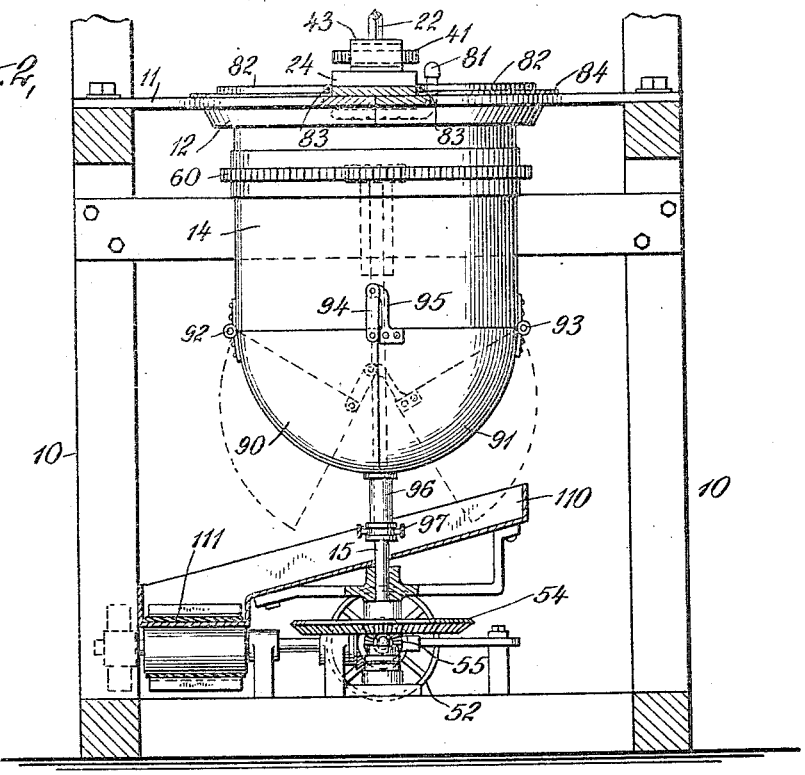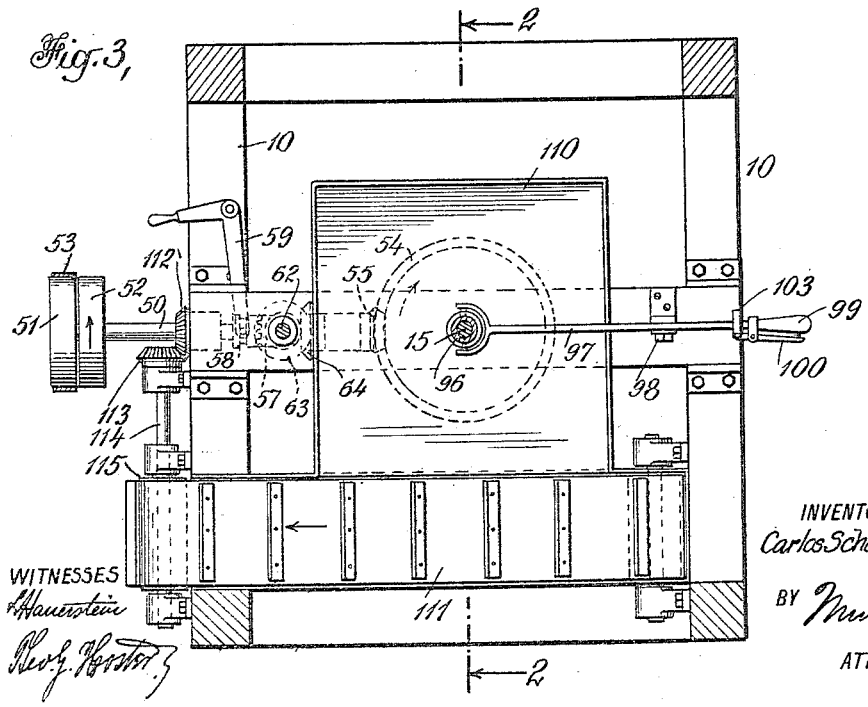

UNITED STATES PATENT OFFICE.

CARLOS SCHÄFLER, OF MERIDA, MEXICO.

HULLING-MACHINE.

1,276,577.

Specification of Letters Patent.  Patented Aug. 20, 1918.

Application filed February 18, 1918. Serial No. 217,900.

*To all whom it may concern:*

Be it known that I, CARLOS SCHÄFLER, a subject of the Emperor of Austria, and a resident of Merida, Yucatan, Mexico, have invented a new and Improved Hulling-Machine, of which the following is a full, clear, and exact description.

The invention relates to hulling machines, such as shown and described in the Letters Patent of the United States No. 1,212,113, granted to me January 9, 1917.

The object of the invention is to provide a new and improved hulling machine more especially designed for hulling cereals, such as maize and Indian corn, without danger of breaking or crushing the grains, thus rendering the hulled grains especially serviceable for the making of tortilla and arepa.

In order to accomplish the desired result, use is made of a revoluble vessel adapted to contain the cereal to be hulled, a plunger arranged eccentrically within the vessel and having both an up and down and a turning motion and coacting with the side of the said vessel, and a revoluble rubbing and agitating means arranged centrally within the vessel and coacting with the said plunger.

A practical embodiment of the invention is represented in the accompanying drawings forming a part of this specification, in which similar characters of reference indicate corresponding parts in all the views.

Figure 1 is a sectional side elevation of the hulling machine;

Fig. 2 is a cross section of the same on the line 2—2 of Fig. 3;

Fig. 3 is a sectional plan view of the same on the line 3—3 of Fig. 1;

Fig. 4 is a similar view of the same on the line 4—4 of Fig. 1;

Fig. 5 is a similar view of the same on the line 5—5 of Fig. 1;

Fig. 6 is an enlarged sectional side elevation of one of the plungers, the section being on the line 6—6 of Fig. 7; and Fig. 7 is a sectional plan view of the same on the line 7—7 of Fig. 6.

In hulling maize or Indian corn for making tortilla or arepa it has been the practice to soak the maize in lime water with a view to loosen the hull, and when this has been accomplished the kernels are rubbed against each other to remove the hull from the grains. In applicant's machine, presently to be described in detail, the hulling is accomplished mechanically without the use of lime water and without crushing or breaking the grains so that the same are in proper condition for making tortilla or arepa.

The machine is mounted on a suitably constructed frame 10 provided with a support 11 for a ball bearing 12 engaged by an annular flange 13 formed on the upper end of a vessel 14 adapted to contain the cereal to be hulled. A shaft 15 extends centrally through the vessel 14 and on it are secured a plurality of rubbing and agitating members 16, preferably in the form of wing or spider wheels one above the other, and having the faces of their wings roughened to provide rubbing and agitating surfaces. Intermediate the rubbing and agitating members 16 and the side wall of the vessel 14 are plungers 20 and 21 disposed on diametrically opposite sides of the rubbing and agitating members 16 and coacting with the latter and with the inner face of the side wall of the vessel 14. The plungers 20 and 21 are mounted to rotate and reciprocate in an up and down direction and alternately in opposite directions. For the purpose mentioned the plungers 20 and 21 are provided with upwardly extending shafts 22, 23, preferably made polygonal in cross section, and journaled in bearings formed on or attached to a plate 24 attached to the main frame 10. The upper ends of the plunger shafts 22 and 23 are provided with heads 25, 26 mounted to turn in bearings 27, 28 held on the lower ends of pitmen 29, 30, engaging cranks 31, 32 of a crank shaft 33 journaled in the upper portion of the main frame 10. The crank shaft 33 is provided at one end with a suitable fly wheel 34 and at the other end with fast and loose pulleys 35, 36 connected by a belt 37 with other machinery for imparting a continuous rotary motion to the crank shaft 33 which by the connection described imparts an up and down movement to the plungers 20 and 21 within the vessel 14.

The plungers 20 and 21 besides having the up and down movement described have a rotary movement, and for this purpose the centrally disposed and driven shaft 15 is provided at the upper end with a gear wheel 40 in mesh with gear wheels 41 and 42 engaging the plunger shafts 22 and 23 to rotate the latter and to allow the same to slide up and down in the gear wheels 41 and 42. The gear wheels 40, 41 and 42 are arranged between the plate 24 and a retaining plate 43 attached to the plate 24 to hold the gear wheels 41 and 42 against up and down movement.

The centrally disposed shaft 15 is driven from a main shaft 50 journaled in the lower portion of the main frame 10 and provided with fast and loose pulleys 51 and 52 connected by a belt 53 with other machinery. On the lower end of the shaft 15 is secured a bevel gear wheel 54 in mesh with a pinion 55 secured on a shaft 56 journaled on the main frame 10 and having its axis coinciding with that of the main shaft 50. On the shaft 56 is secured a clutch member 57 adapted to be engaged by a clutch member 58 mounted to slide on and to turn with the main shaft 50 and controlled by a shifting lever 59 fulcrumed on the main frame 10 and under the control of the operator. When the machine is running, the clutch member 58 is in engagement with the clutch member 57 to rotate the shaft 56 from the main driving shaft 50, and the rotary motion of the shaft 56 is transmitted by the pinion 55 and the gear wheel 54 to the central shaft 15 which by the gear wheels 40, 41 and 42 imparts a rotary motion to the reciprocating plungers 20 and 21.

The vessel 14 is rotated and driven from the shaft 56, and for this purpose the vessel 14 is provided exteriorly with a gear wheel 60 in mesh with a pinion 61 secured on the upper end of a shaft 62 journaled in suitable bearings arranged on the main frame 10. The lower end of the shaft 62 is provided with a bevel gear wheel 63 in mesh with a bevel gear wheel 64 secured on the shaft 56, and when the latter is rotated as above described then a rotary motion is transmitted by such gearing to the vessel 14 to rotate the latter in the same direction in which the plungers 20 and 21 are rotated and in the opposite direction in which the spider wheels 16 are rotated. In practice, I have found that the best result is obtained by proportioning the gearing so that the vessel 14 makes about twenty revolutions per minute while the plungers 20 and 21 and the rubbing and agitating members 16 rotate at about one hundred and fifty revolutions per minute. The plungers 20 and 21 reciprocate at a high rate of speed, that is, about three hundred up and down strokes per minute.

The plungers 20 and 21 are alike in construction and each is formed of a central inverted conical member 70 from which radiate arms 71 in cruciform, on the outer ends of which are secured inverted conical members 72 by the use of screws 73 or other suitable fastening devices. The tops of the members 70 and 72 are smooth and rounded off, while the sides and bottoms of the said members are roughened, as plainly indicated in Figs. 1 and 6. The tops of the arms 71 are likewise smooth while the sides and bottom are roughened thus permitting the plungers to readily move upward in the cereal contained in the vessel 14. By making the members 70 and 72 conical they readily pass downward into the cereal contained in the vessel 14, and by being roughened they facilitate the hulling operation. The shafts 22 and 23 of the plungers 20 and 21 are secured centrally in the upper ends of the central members 70, as plainly shown in the drawings.

Within the upper portion of the vessel 14 is arranged a perforated coil 80 connected with a water supply pipe 81 for discharging water into the cereal prior to starting the machine. Above the top of the vessel 14 is arranged a cover formed of two wire nettings 82 hinged at 83 to opposite sides of a plate 84 attached to the plate 11, as plainly indicated in Figs. 1 and 5. It is understood that by the arrangement described the cover sections 82 can be readily swung into open position for filling the vessel 14 with a cereal to be hulled. The bottom of the vessel 14 is preferably hemispherical and made in two sections 90 and 91 hinged at 92 and 93 to the lower end of the vessel, as plainly indicated in Fig. 2. The sides of the section 90 are connected by links 94 with brackets 95 attached to the side edges of the other section 91 so that the two bottom sections 90 and 91 swing simultaneously into the open or closed position. The bottom sections 90 and 91 are held locked when in closed position by the use of a sleeve 96 mounted to slide loosely up and down on the central shaft 15 directly below the bottom sections, and the sleeve 96 is engaged by a shifting lever 97 fulcrumed at 98 on the main frame 10 and under the control of the operator. The handle 99 of the lever 97 is provided with a locking lever 100 adapted to engage either of two notches 101 and 102 arranged on a bracket 103 secured to the frame 10 so as to hold the lever 97 locked in uppermost or lowermost position. After the hulling operation is completed, the lever 97 is manipulated by the operator to slide the locking sleeve 96 downward and thus allow the bottom sections 90 and 91 to swing open by the weight of the hulled cereals within the vessel 14. The hulled cereals pass through the open bottoms 90 into a chute 110 mounted on the main frame 10 and delivering the hulled cereal to an endless conveyer 111 of any approved construction for delivering the hulled grain to one side of the machine, preferably to a separating mill (not shown) for separating the kernels from the hulls and hilums. The endless conveyer 111 is driven from the main shaft 50 by a suitable gearing, such as shown in Fig. 3, and consisting of a bevel gear wheel 112 secured on the shaft 50 and in mesh with a bevel gear wheel 113 secured on a shaft 114 forming part of a driving roller 115 of the endless conveyer 111.

In order to facilitate the closing of the bottom sections 90 and 91, use is made of a closing device in the form of a friction roller 120 journaled in a head 121 held on one end of a rod 122 mounted to slide in a suitable bearing 123 attached to the main frame 10. The rod 122 is pressed on by a spring 124 to normally hold the rod in an outermost inactive position, and on the outer end of the rod 122 is secured a handle 125 adapted to be taken hold of by the operator for pushing the rod 122 inward to cause the friction roller 120 to engage one of the bottom sections 90 or 91 to swing the same shut and as this bottom section is connected by the link 94 and bracket 95 with the other bottom section, it is evident that both sections move simultaneously into closed position. When this position has been reached the operator manipulates the lever 97 with a view to raise the sleeve 96 to lock the bottom sections 90 and 91 in their closed position. The vessel 14 is then filled with the cereal to about the height of the upper rubbing and agitating member 16.

The operation is as follows:

When the vessel 14 is charged with the maize or other cereal and the clutch member 58 turning with the continually rotating shaft 50 is thrown into engagement with the clutch member 57 then a simultaneous rotary motion is given to the vessel 14, the agitating and rubbing members 16 and the plungers 20 and 21, which plungers in addition are reciprocated up and down owing to their connection with the rotating crank shaft 33. As soon as the machine is started a small amount of water is discharged through the perforated pipe 80 to moisten the cereal contained in the vessel 14. It will be noticed that the up and down and rotary movement of the plungers 20 and 21, the rotary movement of the rubbing and agitating members 16 and the rotating movement of the vessel 14 cause the kernels to be set in motion, and the said kernels are caused to rub against each other and against the roughened surfaces of the members of the plungers 20 and 21 as well as the roughened surfaces of the rubbing and agitating members 16 so that the hulls are gradually detached from the grains, the operation being facilitated by the supplied moisture. It will be noticed that by the peculiar movement given to the coacting parts the kernels are caused to travel in various directions to insure a complete separation of the hulls from the grains and without danger of the grains being crushed or broken. The plungers 20 and 21 when at the end of their downward stroke are within the hemispherical bottom of the vessel 14 and there coact with the revolving lowermost rubbing and agitating members 16 so that the grains in the bottom are agitated and rubbed and none of the grains is liable to remain dormant during the time the machine is in operation.

The machine is kept running until the grains and hulls are completely separated together with the hilum of each grain, and when this stage is reached the operator may stop the machine or keep the same running but he manipulates the lever 97 to lower the sleeve 96 with a view to permit the bottom sections 90 and 91 to swing open thus discharging the hulled grains into the chute 110 which delivers the hulled cereal to the conveyer 111 to carry it off the machine. When this has been done the operator takes hold of the handle 125 of the bottom closing device to close the bottom sections 90 and 91, after which the lever 97 is manipulated to raise the sleeve 96 and thus lock the bottom sections in closed position. The vessel 14 is now refilled to the hinged covers 82, which are opened for this purpose, and then the above described operation is repeated.

It is understood that in making tortilla or arepa it is necessary that the maize be completely freed from the hull and hilum and that the grain remains in wholly unbroken condition. The grain, as is well known, is cooked in water and left in water until it is completely saturated and then the grain is reduced and formed into a dough which is divided into small cakes and baked to form tortilla or arepa. If the grains were crushed prior to cooking only the formation of a paste would be the result, hence it is absolutely necessary that all crushing or breaking during the hulling operation is avoided. This result is achieved by the use of the machine above described.

Having thus described my invention, I claim as new and desire to secure by Letters Patent:—

1. In a hulling machine, a revoluble vessel adapted to contain the cereal to be hulled, a plunger eccentrically within the vessel and having an up and down and a turning motion, the plunger coacting with the inner surface of the said vessel, and revoluble rubbing and agitating means arranged centrally within the vessel and coacting with the said plunger.

2. In a hulling machine, a vessel adapted to contain the cereal to be hulled, a revoluble rubbing and agitating device arranged centrally within the vessel, and a reciprocating plunger within the vessel intermediate the side wall of the vessel and the said rubbing and agitating device.

3. In a hulling machine, a vessel adapted to contain the cereal to be hulled, a rubbing and agitating device arranged centrally within the vessel, a reciprocating plunger within the vessel intermediate the side wall of the vessel and the said rubbing and agitating device, means for rotating the said vessel, means for rotating the said rubbing and agitating device and the said plunger, and means for moving the plunger up and down.

4. In a hulling machine, a vessel adapted to contain the cereal to be hulled, a rubbing and agitating device arranged centrally within the vessel a reciprocating plunger within the vessel intermediate the side wall of the vessel and the said rubbing and agitating device, means for rotating the said vessel at a low rate of speed, means for rotating the said rubbing and agitating device and the said plunger in opposite directions and approximately at the same rate of speed and at a higher rate of speed than the said vessel, and means for moving the plunger up and down.

5. In a hulling machine, a revoluble vessel adapted to contain the cereal to be hulled, a revoluble shaft extending centrally on the said vessel, rubbing and agitating members secured on the said shaft one above the other, plungers arranged within the vessel between the said rubbing and agitating members and the side wall of the vessel, means to reciprocate the said plungers up and down, and means to rotate the said plungers from the said shaft.

6. In a hulling machine, a vessel adapted to contain the cereal to be hulled and a plunger arranged within the vessel and coacting with the side wall thereof, the said plunger having an up and down and a turning motion and the plunger having vertically disposed cone shaped hulling members.

7. In a hulling machine, a plunger having vertically disposed cone-shaped hulling members, of which one is disposed centrally and the others are grouped around the central one and spaced from the latter and from each other, the surfaces of the said hulling members being roughened.

8. In a hulling machine, a plunger having vertically disposed cone-shaped hulling members, the bases of which are uppermost and rounded off and the sides are roughened.

9. In a hulling machine, a plunger having vertically disposed cone-shaped hulling members, of which one is centrally disposed and provided with radial arms supporting the other hulling members, the said hulling members and the said arms being roughened at the sides and bottoms.

10. In a hulling machine, a plunger having vertically disposed cone-shaped hulling members, of which one is centrally disposed and provided with radial arms supporting the other hulling members, the said hulling members and the said arms being roughened at the sides and bottoms, and the tops being smooth and rounded off.

11. In a hulling machine, a vessel adapted to contain the cereal to be hulled, and provided with a bottom made in hinged sections to allow of opening and closing the said bottom, a link connection connecting the said bottom sections with each other, a shaft extending centrally through the said vessel, and manually controlled means below the said bottom to engage the latter and hold it locked in closed position.

12. In a hulling machine, a vessel adapted to contain the cereal to be hulled and provided with a bottom made in hinged sections to allow of opening and closing the said bottom, a link connection connecting the said bottom sections with each other, a shaft extending centrally through the said vessel, a sleeve mounted to slide on the said shaft below the said bottom to engage the latter and hold it locked in closed position, and a lever controlling the said sleeve.

13. In a hulling machine, a vessel adapted to contain the cereal to be hulled, means for rotating the said vessel, a driven shaft extending centrally through the said vessel, rubbing and agitating spider wheels secured on the said shaft within the said vessel, plungers within the vessel intermediate the said wheels and the side wall of the said vessel, plunger shafts carrying the said plungers, means connected with the said plunger shafts to move the same up and down, and means connecting the said central shaft with the said plunger shafts to rotate the latter from the said central shaft.

14. In a hulling machine, a vessel adapted to contain the cereal to be hulled, means for rotating the said vessel, a driven shaft extending centrally through the said vessel, rubbing and agitating spider wheels secured on the said shaft within the said vessel, plungers within the vessel intermediate the said wheels and the side wall of the said vessel, plunger shafts carrying the said plungers, means connected with the said plunger shafts to move the same up and down, and means connecting the said central shaft with the said plunger shafts to rotate the latter from the said central shaft, a main shaft, gearing connecting the said main shaft with the said central shaft, and gearing connecting the said main shaft with the said vessel to rotate the latter.

CARLOS SCHÄFLER.